United States Patent
Klassen et al.

(10) Patent No.: US 7,718,239 B2
(45) Date of Patent: May 18, 2010

(54) GAS TIGHT VESSEL WITH A DIFFUSION BARRIER LAYER OF METAL HYDRIDES

(75) Inventors: Thomas Klassen, Wentorf (DE); Martin Dornheim, Reppenstedt (DE); Rudiger Bormann, Rosengarten (DE); Uz Baumgart, Trebur (DE)

(73) Assignee: GKSS-Forschungszentrum Geesthacht GmbH, Geesthacht (DE)

( * ) Notice: Subject to any disclaimer, the term of this patent is extended or adjusted under 35 U.S.C. 154(b) by 300 days.

(21) Appl. No.: 11/546,778

(22) Filed: Oct. 12, 2006

(65) Prior Publication Data

US 2007/0089764 A1 Apr. 26, 2007

(30) Foreign Application Priority Data

Oct. 12, 2005 (DE) ................... 10 2005 048 714

(51) Int. Cl.
*B29D 22/00* (2006.01)
*B65D 85/00* (2006.01)
(52) U.S. Cl. .............. 428/35.7; 428/36.92; 206/0.7
(58) Field of Classification Search .............. None
See application file for complete search history.

(56) References Cited

U.S. PATENT DOCUMENTS

| 3,921,844 | A | | 11/1975 | Walles | |
|---|---|---|---|---|---|
| 4,055,686 | A | * | 10/1977 | Steinberg et al. | ............ 427/124 |
| 4,073,400 | A | | 2/1978 | Brook et al. | |
| 4,249,654 | A | * | 2/1981 | Helversen | ............ 206/0.7 |
| 4,925,044 | A | | 5/1990 | Hembert et al. | |
| 2003/0070487 | A1 | * | 4/2003 | DaCosta et al. | ............ 73/708 |
| 2004/0009121 | A1 | * | 1/2004 | Jensen et al. | ............ 423/648.1 |
| 2004/0142203 | A1 | * | 7/2004 | Woolley | ............ 428/615 |
| 2004/0149759 | A1 | * | 8/2004 | Moser et al. | ............ 220/581 |

FOREIGN PATENT DOCUMENTS

| DE | 3821852 | 2/1990 |
|---|---|---|
| DE | 19826681 | 12/1999 |
| EP | 0300931 | 1/1989 |
| EP | 0629810 | 12/1994 |
| WO | WO-0066939 | 11/2000 |
| WO | WO-02088593 | 11/2002 |

OTHER PUBLICATIONS

Gross (US Dept. Of Energy 2000 <http://www.osti.gov/bridge/purl.cover.jsp?purl=/769322-pWw1J9/native/>).*

V.A. Yartys and M.V. Lototsky. "An Overview of Hydrogen Storage Methods", pp. 75-104, NATO Science Series, Hydrogen Materials Science and Chemistry of Carbon Nanomaterials, The 2003 International Conference; NATO Science Series II: Mathematics, Physics and Chemistry NATO ASI, Series E., Dec. 22, 2004.*

(Continued)

*Primary Examiner*—Timothy M Speer
(74) *Attorney, Agent, or Firm*—Marshall, Gerstein & Borun LLP

(57) ABSTRACT

The present invention relates to a gas tight storage and/or transport tank for low molecular filling media, in particular for hydrogen, with a tank wall which comprises a thermoplastic polymer and at least one diffusion barrier. The diffusion barrier comprises a metal hydride.

8 Claims, 1 Drawing Sheet

OTHER PUBLICATIONS

Schlapbach et al. "Hydrogen-storage materials for mobile applications." Nature, 14: 353-358, 2001.*

Moser, E. M. et al., "Hydrocarbon Films Inhibit Oxygen Permeation Through Plastic Packaging Material," *Preparation and Characterization, Elsevier,* Sequoia, NL, vol. 317, No. 1-2, Apr. 1, 1998, pp. 388-392.

International Search Report for PCT/CH02/00229.

* cited by examiner

GAS TIGHT VESSEL WITH A DIFFUSION BARRIER LAYER OF METAL HYDRIDES

CROSS-REFERENCE TO RELATED APPLICATION

The present application claims the benefit of priority of German Patent Application No. 10 2005 048 714.9 filed Oct. 12, 2005. The entire text of the priority application is incorporated herein by reference in its entirety.

FIELD OF THE INVENTION

The present invention relates to gas tight storage and/or transport tanks for low molecular filling media, in particular hydrogen.

BACKGROUND AND PRIOR ART

Energy storage by means of hydrogen has been gaining increasing importance recently. There are today various techniques for storing hydrogen, it being possible to distinguish between storage in the gaseous, liquid or, in the form of metal hydrides, in the chemically bound state.

Small quantities of hydrogen can be stored simply in compressed gas bottles. In this respect, the following basic principle applies: the higher the pressure in the tank the higher is the storage density. In connection with the introduction of vehicles driven with natural gas, compressed gas tanks of steel have been developed which are, as a rule, officially approved for a filling pressure of up to 250 bar. Usually, containers are nowadays made of metal in order to counteract the embrittlement tendency of hydrogen and in order to achieve the required compressive strength. Austenitic steels are used predominantly. However, pressure tanks made of steel have the disadvantage that they have a high inherent weight and require cumbersome insulation which considerably restricts the reach of mobile systems.

For the use of fuel cells, small tanks with a high energy density are required which are to guarantee a maximum reach in the mobile sector. For this reason, composite tanks (full composite pressure flasks) were developed which can be filled from time to time up to a pressure of 350 bar. The volume-specific storage density ranges 0.5 kWh/1 for steel bottles to as much as 0.8 kWh/1 for full composite bottles.

Moreover, storage of hydrogen in the liquid phase in cryogenic tanks at temperatures down to −250° C. is common.

Tanks with a metal hydride fill are not subject to the high requirements regarding isolation or pressure. The effective pressure level is between 5 and 50 bar and the temperatures which arise for absorption and desorption of hydrogen are between 20° C. and approximately 280° C., depending on the hydride used.

As a result of the requirements regarding the tank material being relatively low in comparison with other types of storage vessels, those with a plastic jacket are used as a rule. The disadvantage of a plastic jacket is the relatively low molecular density as a result of which diffusion of the hydrogen from the tank is possible. By cross-linking the molecular chain of the plastic material and/or using special diffusion barriers, the diffusion of hydrogen from the tank can be reduced.

Such a plastic tank with a diffusion barrier is disclosed in WO 02/088593 A1, for example. Preferably, a metal-plastic composite film is used as diffusion barrier. In practice, it has been found that even such a diffusion barrier cannot fully exclude the diffusion of hydrogen.

SUMMARY

It is consequently the object to make gas tight storage or transport tanks for low molecular filling media with a container wall of thermoplastic polymer available which guarantee a further reduction of the hydrogen diffusion from the tank.

This object is achieved by a tank according to claim 1. Preferred embodiments of the tank are described in the subclaims.

Moreover, it is the object to provide a process for the manufacture of such a gas tight tank. This object is achieved by a process according to claim 12.

BRIEF DESCRIPTION OF THE DRAWINGS

The invention will now be explained more fully by way of the attached figures, in which.

DETAILED DESCRIPTION

Figure 1:
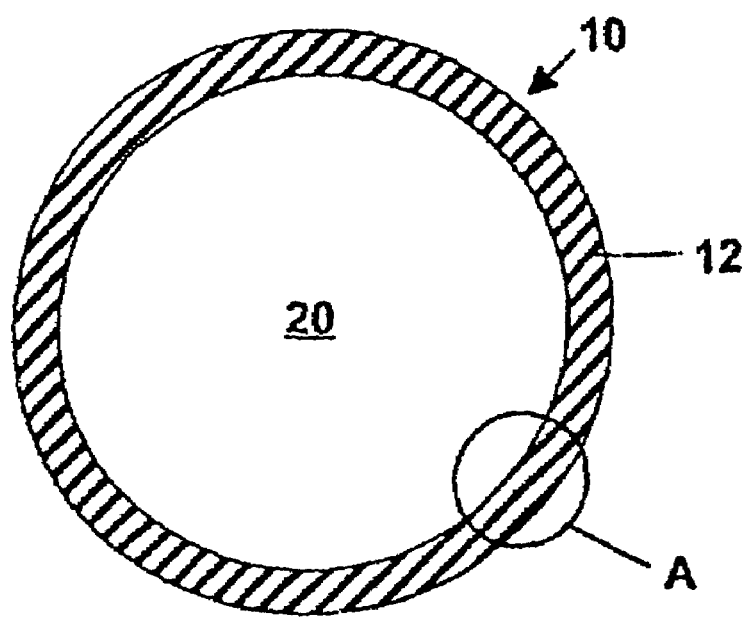
FIG. 1 represents a radial section through a tank and
FIG. 2 represents details of the tank wall in the area of FIG. 1.
Figure 2:
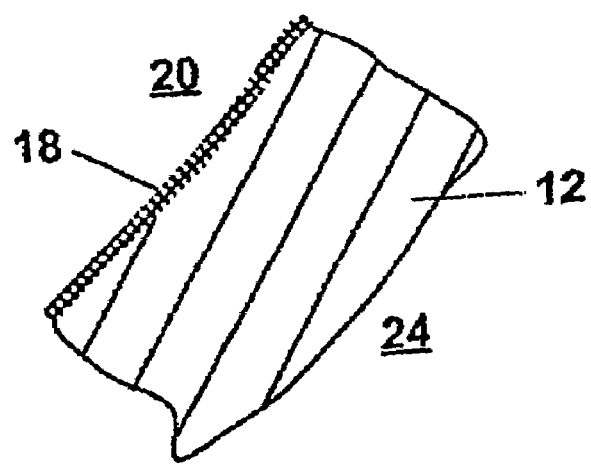

FIG. 1 shows a radial section through a gas tight storage and/or transport tank 10 for low molecular filling media with a tank wall 12 which comprises a thermoplastic polymer. Moreover, a diffusion barrier 18 is provided. According to the invention, the diffusion barrier 18 comprises a metal hydride.

Preferably the low molecular filling media are selected from hydrogen. Moreover, it is preferred that the hydrogen is stored in the form of a metal hydride which exhibits a hydrogen desorption temperature which is lower than or the same as the hydrogen desorption temperature of the metal hydride of the diffusion barrier 18.

Alternatively, the hydrogen can be stored in the form of hydrogen gas or in the liquid form.

Metal hydrides can be divided into three groups on the basis of their decomposition temperature. Low temperature hydrides such as $LaNi_5H_6$ release hydrogen at temperatures below 80° C. Medium temperature hydrides such as $NaAlH_4$ release hydrogen at temperatures of 80 to 200° C. High temperature hydrides such as $MgH_2$ release hydrogen at temperatures above 200° C.

When using low temperature hydrides such as $LaNi_5H_6$ which release hydrogen at temperatures below 80° C., the diffusion barrier 18 preferably consists of a medium temperature hydride or a high temperature hydride. When using medium temperature hydrides such as $NaAlH_4$ as hydrogen tank, the barrier layer preferably consists of a high temperature hydride such as magnesium hydride, lithium hydride, niobium hydride, titanium hydride, lanthanum hydride or rare earth hydrides.

In this way, it is ensured that the pressure/temperature level necessary for the desorption of the storage jacket layer of hydride material is not reached in the state of operation as a result of which the effectiveness of the diffusion barrier 18 is maintained. Should the operating parameters briefly fall below the required level during the use of the tank, the free hydrogen which is always present in the tank guarantees the regeneration of the barrier layer as a result of the hydrogen potential present.

Consequently, the metal hydride of the diffusion barrier 18 exhibits a hydrogen desorption temperature of 80° C. to 200° C., preferably of 100 to 200° C. In this case, sodium aluminium hydride ($NaAlH_4$) is preferred. However, the metal hydride in the diffusion barrier can also have a hydrogen desorption temperature of more than 200° C., preferably more than 210° C. In this case, magnesium hydride is preferred. It is most preferred for the diffusion barrier 18 to consist of metal hydride.

The tank wall 12 can comprise any thermoplastic polymer, preferably the tank wall 12 comprises polyacrylic material.

The diffusion barrier is produced by coating the tank wall 12 first with the metal or the metal alloy of diffusion barrier 18. After applying the metal or the metal alloy, the diffusion barrier is activated by exposing the tank to the temperatures and hydrogen pressures necessary for charging the diffusion barrier with hydrogen. Preferably, a complete conversion to the hydride takes place during this process. Surprisingly enough, it has been found that the coefficients of expansion of the polymer and the hydride, in particular magnesium hydride, are almost identical. Thus the mechanical stress on the composite system by temperature change stresses is extremely low.

Subsequently, the tank can be filled with the storage material and activated. The pressure/temperature level required for the desorption of the tank jacket layer of hydride material is not reached during this process.

Alternatively, the diffusion barrier can also be produced by coating the tank wall 12 directly with the metal hydride.

In the case of the use of a diffusion barrier 18 of an irreversible metal hydride, the irreversible hydride is applied on the inside or outside of the tank jacket, depending on the material used for the tank wall 12. The possibility of a deactivation of the barrier layer by falling below the operating parameters of the tank can be discounted also in this case. Preferably, the diffusion barrier 18 is applied onto the inside of the tank 10.

The diffusion barrier 18 preferably has a thickness of 0.01 to 1000 μm, preferably of 0.1 to 100 μm and in particular of 1 to 20 μm.

What is claimed is:

1. Gas tight storage and/or transport tank (10) for low molecular filling media with a tank wall (12) which comprises a thermoplastic polymer and at least one diffusion barrier (18), wherein said low molecular filling media is hydrogen which is present in the form of a metal hydride, and said diffusion barrier (18) comprises a metal hydride which exhibits a hydrogen desorption temperature above 100° C. and wherein the hydrogen desorption temperature is lower than the hydrogen desorption temperature of the metal hydride of the diffusion barrier (18).

2. Tank (10) according to claim 1 characterised in that the metal hydride of the diffusion barrier (18) exhibits a hydrogen desorption temperature of 100° C. to 200° C.

3. Tank (10) according to claim 2 characterised in that the diffusion barrier (18) comprises sodium alanate ($NaAlH_4$).

4. Tank (10) according to claim 1 characterised in that the metal hydride of the diffusion barrier (18) exhibits a hydrogen desorption temperature above 210° C.

5. Tank (10) according to claim 4 characterised in that the diffusion barrier (18) comprises magnesium hydride ($MgH_2$).

6. Tank (10) according to claim 1 characterised in that the diffusion barrier (18) consists of a metal hydride.

7. Tank (10) according to claim 1 characterised in that the tank wall (12) comprises polyacrylic material.

8. Process for the manufacture of a tank (10) according to claim 1 characterised in that the tank wall (12) is first coated with the metal or the metal alloy of the diffusion barrier (18) and subsequently the metal hydride is formed by reaction with hydrogen.

* * * * *